(12) United States Patent
Awwad et al.

(10) Patent No.: US 8,789,381 B2
(45) Date of Patent: Jul. 29, 2014

(54) TRUCK TRAILER REFRIGERATION SYSTEM

(75) Inventors: Nader S. Awwad, Baldwinsville, NY (US); Michael Stockbridge, Canastota, NY (US)

(73) Assignee: Carrier Corporation, Farmington, CT (US)

( * ) Notice: Subject to any disclaimer, the term of this patent is extended or adjusted under 35 U.S.C. 154(b) by 395 days.

(21) Appl. No.: 13/127,603

(22) PCT Filed: Dec. 14, 2009

(86) PCT No.: PCT/US2009/067856
§ 371 (c)(1),
(2), (4) Date: May 4, 2011

(87) PCT Pub. No.: WO2010/077812
PCT Pub. Date: Jul. 8, 2010

(65) Prior Publication Data
US 2011/0247350 A1 Oct. 13, 2011

Related U.S. Application Data

(60) Provisional application No. 61/141,074, filed on Dec. 29, 2008.

(51) Int. Cl.
*F25B 1/00* (2006.01)

(52) U.S. Cl.
USPC .............. 62/115; 62/196.1; 62/196.4; 62/239

(58) Field of Classification Search
CPC ................. F25B 41/04; F25B 2400/13; F25B 2600/2509
USPC ............................ 62/117, 244, 512, 513, 113, 62/196.1–196.2, 237, 323.3
See application file for complete search history.

(56) References Cited

U.S. PATENT DOCUMENTS

| 6,058,729 | A | 5/2000 | Lifson et al. | |
|---|---|---|---|---|
| 6,196,012 | B1 | 3/2001 | Reason et al. | |
| 6,405,550 | B1 | 6/2002 | Reason et al. | |
| 6,487,869 | B1 * | 12/2002 | Sulc et al. | 62/230 |
| 6,543,242 | B2 | 4/2003 | Reason et al. | |
| 6,955,059 | B2 | 10/2005 | Lifson et al. | |
| 7,878,013 | B2 * | 2/2011 | Matsuno et al. | 62/228.1 |
| 2003/0000236 | A1 * | 1/2003 | Anderson et al. | 62/228.3 |
| 2007/0130973 | A1 * | 6/2007 | Lifson et al. | 62/196.3 |
| 2009/0056354 | A1 * | 3/2009 | Davis et al. | 62/236 |

FOREIGN PATENT DOCUMENTS

| EP | 0365351 | 4/1990 |
|---|---|---|
| EP | 0921364 | 6/1999 |
| EP | 1950509 | 7/2008 |

OTHER PUBLICATIONS

International Search Report and Written Opinion mailed Jun. 9, 2010.

* cited by examiner

*Primary Examiner* — Lakiya Rogers
(74) *Attorney, Agent, or Firm* — Cantor Colburn LLP

(57) ABSTRACT

The refrigeration unit of an electrically powered trailer refrigeration system includes an economized scroll compressor and an economizer circuit selectively operable to inject refrigeration vapor into an intermediate stage of the scroll compressor. An engine driven generator produces AC current to power the scroll compressor and other electric components of the system. During operation of the refrigeration system at high capacity demand, a controller will operate the refrigeration system in an economized mode if sufficient electric power is available from the generator and in the non-economized mode if insufficient power is available to sustain operation of the refrigeration system in the economized mode.

8 Claims, 1 Drawing Sheet

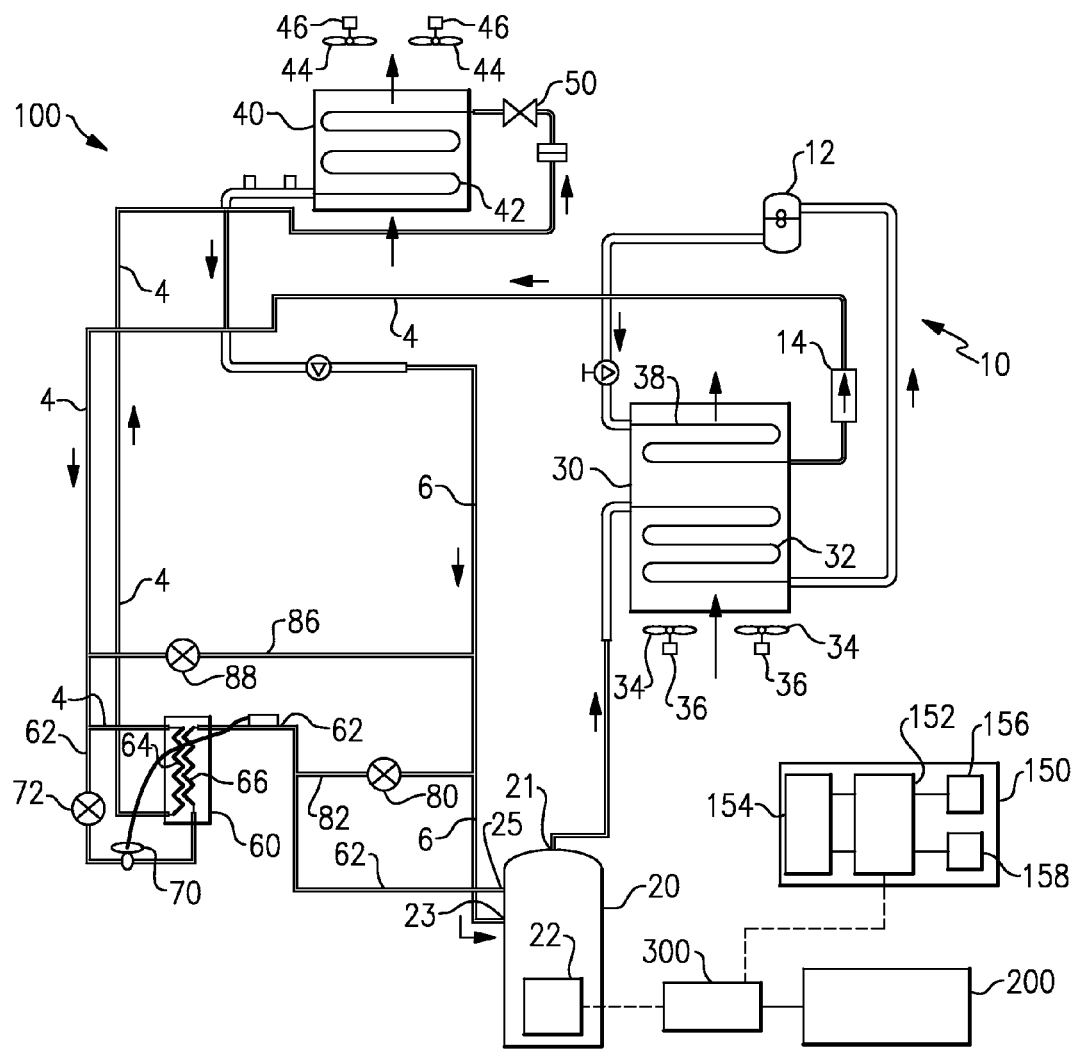

TRUCK TRAILER REFRIGERATION SYSTEM

CROSS-REFERENCE TO RELATED APPLICATION

Reference is made to and this application claims priority from and the benefit of U.S. Provisional Application Ser. No.: 61/141,074, filed Dec. 29, 2008, and entitled TRUCK TRAILER REFRIGERATION SYSTEM.

FIELD OF THE INVENTION

This invention relates generally to truck trailer transport refrigeration systems and, more particularly, to reducing engine horsepower and generator power required to operate an electrically powered truck trailer refrigeration unit.

BACKGROUND OF THE INVENTION

Truck trailers used to transport perishable and frozen goods include a refrigerated trailer pulled behind a track cab unit. The refrigerated trailer, which houses the perishable or frozen cargo, requires a refrigeration unit for maintaining a desired temperature environment within the interior volume of the container. The refrigeration unit must have sufficient refrigeration capacity to maintain the product stored within the trailer at the desired temperature over a wide range of ambient air temperatures and load conditions. Refrigerated trailers of this type are used to transport a wide variety of products, ranging for example from freshly picked produce to deep frozen seafood. Product may be loaded into the trailer unit directly from the field, such as freshly picked fruits and vegetables, or from a warehouse.

One type of transport refrigeration system used in connection with truck trailers includes an electrically powered refrigeration unit operatively associated with the trailer. The refrigeration unit includes a hermetic, motor driven, reciprocating refrigerant compressor, a condenser heat exchanger unit, an expansion device, commonly an electronic or a thermostatic expansion valve (TXV), and an evaporator heat exchanger unit connected via appropriate refrigerant lines in a closed refrigerant circuit, and an engine driven electric generator. The refrigeration unit, the generator and the engine that drives the generator are contained in a framework that is attached to the front wall of the trailer behind the truck cab such that the air or gas/air mixture or other gas within the interior volume of the trailer may be circulated over the evaporator coil of the evaporator heat exchanger unit by means of an evaporator fan associated with the evaporator coil which is disposed within the interior of the trailer, typically mounted in an opening in the front wall to which the refrigeration unit is attached. The electric generator driven by a diesel powered engine and adapted to produce AC current at a selected voltage and frequency to power a compressor drive motor driving the reciprocating refrigeration compressor, at least one condenser fan motor, at least one evaporator fan motor, and all other electric powered devices associated with the refrigeration unit. For example, U.S. Pat. No. 6,223,546, assigned to Carrier Corporation, discloses a transport refrigeration unit configured to be mounted on the front wall of a refrigerated transport trailer.

It is desirable that the truck/trailer refrigeration units operate efficiently over a wide range of refrigeration capacity demands. The refrigeration unit must be capable of providing sufficient refrigerant capacity during "pulldown" to, within a limited time, reduce the temperature within the cargo box of the trailer when newly loaded perishable product, which may be field-loaded at ambient temperature, down to the desired storage temperature. The refrigerant unit must also be capable of providing sufficient refrigerant capacity to maintain a low box temperature for frozen product (0° C. (32° F.)) or for deep frozen product (−18° C. (about 0° C.)) even under high ambient temperature conditions. The refrigeration unit should also be capable of efficient operation at very low refrigeration capacity, for example, when transporting a product that is to be stored at or near ambient temperature.

Although electrically powered trailer refrigeration units have exhibited improved reliability, due in part to the reciprocating compressor being motor driven as opposed to belt driven, the electrical losses due to the all electric architecture of current electrically powered trailer refrigeration units present challenges when designing a system to meet refrigeration capacity targets. The more electric power available, the more refrigeration capacity potential an all electric refrigeration unit has. To compensate for electrical losses, engine, generator, compressor, fan and coil sizing are typically increased in order to meet the system refrigeration capacity requirements, which has a direct effect on system cost, fuel efficiency, emissions, and available design envelope. In some locations, refrigerated trailer designs are standard and have specific requirements regarding the size that a refrigeration unit can be. This results in significant design space limitations.

SUMMARY OF THE INVENTION

In an aspect of the invention, an electrically powered trailer refrigeration system includes an economized scroll compressor, a condenser heat exchanger unit, an evaporator expansion device, and an evaporator heat exchange unit, arranged in a primary refrigerant circuit, an engine driven electric generator, and an economizer circuit. The economized scroll compressor has a discharge port, a suction port, an intermediate pressure stage injection port, and an electric drive motor. The condenser heat exchanger unit has a refrigerant inlet coupled in refrigerant flow communication with the discharge port of the compressor, a refrigerant outlet, and a condenser fan assembly having at least one electric fan motor. The evaporator heat exchanger unit has a refrigerant outlet coupled in refrigerant flow communication with the suction port of the compressor, a refrigerant inlet coupled in refrigerant flow communication with the refrigerant outlet of the condenser heat exchanger, thereby forming a primary refrigerant circuit, and an evaporator fan assembly having at least one electric fan motor. The evaporator expansion device is disposed in the primary refrigerant circuit in operative association with the evaporator. The engine driven electric generator produces A.C. electric current to power the compressor drive motor, the condenser fan motor and the evaporator fan motor. The economizer circuit is operatively associated with the economized scroll compressor and in refrigerant flow communication with the intermediate compression stage injection port of the economized scroll compressor. The refrigeration system may also include a controller for selectively operating the economized scroll compressor in one of an economized mode or a non-economized mode during high refrigeration capacity demand on the refrigeration system In an embodiment, the electrically powered trailer refrigeration system may include a bypass circuit operatively associated with the primary refrigerant circuit and the economizer circuit and also a controller for selectively operating the economized scroll compressor in one of a non-economized mode or a bypass mode during low refrigeration capacity demand on the refrigeration system.

In an aspect of the invention, a method is provided for optimizing the operation of an electrically powered trailer refrigeration system including a refrigeration unit including a refrigeration compressor driven by an electric motor, a condenser heat exchanger unit having at least one condenser fan driven by an electric motor, and an evaporator heat exchanger unit having at least one evaporator fan driven by an electric motor, the refrigeration compressor, the condenser heat exchanger unit and the evaporator heat exchanger unit coupled in refrigerant flow communication in a primary refrigerant circuit, and an electric generator for providing power to each of the compressor drive motor, the condenser fan motor and the evaporator fan motor. The method includes the steps of: providing a scroll compressor selectively operable in an economized mode or a non-economized mode as the refrigeration compressor; providing an economizer circuit in operative association with the scroll compressor, the economizer circuit being selectively opened or closed; determining a maximum power available from the electric generator can produce under existing engine horsepower; determining an overall required power to operate the refrigeration system including the compressor drive motor, the condenser fan motor and the evaporator fan motor; selectively opening the economizer circuit and operating the compressor in the economized mode if the maximum available power exceeds the overall required power for operation of the refrigeration system in the economized mode; and selectively closing the economizer circuit and operating the compressor in the non-economized mode if the maximum available power is less than the overall required power for operation of the refrigeration system in the economized mode.

In an aspect of the invention, a method is provided for optimizing the operation of an electrically powered refrigeration system including a refrigeration unit including a refrigeration compressor driven by an electric motor, a condenser heat exchanger unit having at least one condenser fan driven by an electric motor, and an evaporator heat exchanger unit having at least one evaporator fan driven by an electric motor, the refrigeration compressor, the condenser heat exchanger unit and the evaporator heat exchanger unit coupled in refrigerant flow communication in a primary refrigerant circuit, and an electric generator for providing power to each of the compressor drive motor, the condenser fan motor and the evaporator fan motor. The method includes the steps of: providing a scroll compressor selectively operable in an economized mode or a non-economized mode as the refrigeration compressor; providing an economizer circuit in operative association with the scroll compressor, the economizer circuit being selectively opened or closed; providing a bypass circuit connecting an intermediate pressure stage of the scroll compressor in refrigerant flow communication with a suction inlet of the scroll compressor, the bypass circuit being selectively opened or closed; determining a refrigeration demand on the refrigeration system; determining a maximum power available from the electric generator; determining an overall required power to operate the refrigeration system including the compressor drive motor, the condenser fan motor and the evaporator fan motor to meet the determined refrigeration demand; selectively opening the economizer circuit and closing the bypass circuit and operating the compressor in the economized mode if the maximum available power exceeds the overall required power for operation of the refrigeration system in the economized mode when the determined refrigeration demand is at a refrigeration system design capacity; selectively closing the economizer circuit and closing the bypass circuit and operating the compressor in the non-economized mode if the maximum available power is less than the overall required power for operation of the refrigeration system in the economized mode when the determined refrigeration demand is at a refrigeration system design capacity; and selectively closing the economizer circuit and closing the bypass circuit and operating the compressor in the non-economized mode if the available power exceeds the overall required power for operation of the refrigeration system in the non-economized mode when the determined refrigeration demand is below a refrigeration system design capacity.

BRIEF DESCRIPTION OF THE DRAWINGS

For a further understanding of the disclosure, reference will be made to the following detailed description which is to be read in connection with the accompanying drawing, where:

FIG. 1 is a schematic drawing of an exemplary embodiment of a trailer refrigeration system in accordance with the present invention.

DETAILED DESCRIPTION OF THE INVENTION

Referring now to FIG. 1, there is shown schematically, an exemplary embodiment of a truck trailer refrigeration system 100 including a prime mover 200, a electric generator 300 operatively associated with the prime mover 200, and a transport refrigeration unit 10. The transport refrigeration unit 10 functions to regulate and maintain a desired product storage temperature range within a refrigerated volume wherein a perishable product is stored during transport, such as a refrigerated box of a trailer. The refrigeration unit 10 includes a compressor 20, a condenser heat exchanger unit 30 including a condenser heat exchange coil 32 and at least one associated condenser fan 34 and fan motor 36 assembly, an evaporator heat exchanger unit 40 including an evaporator heat exchanger coil 42 and at least one associated evaporator fan 44 and fan motor 46 assembly, and an evaporator expansion device 50, such as an electronic expansion valve (EXV) or a thermostatic expansion valve (TXV), connected in a conventional refrigeration cycle by refrigerant lines 2, 4 and 6 in a refrigerant flow circuit. The condenser heat exchanger unit 30 may also include a subcooling coil 38 disposed in series refrigeration flow relationship with and downstream of the primary condenser heat exchange coil 32. In addition, a receiver 12 may be included in the refrigerant circuit between the refrigerant outlet of the primary condenser coil 32 and the refrigerant inlet to the subcooling coil 38. A sight glass 14 may also be provided as in conventional practice.

As will be discussed in further detail hereinafter, in an aspect of the invention, the refrigeration compressor 20 of the refrigeration unit 10 comprises an economized scroll compressor and the refrigeration unit 10 includes an economizer circuit selectively operable to inject refrigeration vapor into an intermediate stage of the scroll compressor 20. An electric drive motor 22 drives the scroll compressor 20. The electric motor is connected to a drive shaft associated with the scroll compression mechanism of the scroll compressor 20. In an embodiment, the scroll compressor 20 may comprise a hermetic compressor wherein the drive motor 22 is housed within the scroll compressor 20 in a sealed housing. Electric current supplied by means of the electric generator 300, which in turn is driven by the prime mover 200, drives the electric drive motor 22. The prime motor 200 may be diesel-powered engine or a gas-powered engine. In an embodiment, the prime mover may comprise a four cylinder, 2200 cc displacement diesel-powered engine. In an embodiment, the generator 300 may be configured to produce three-phase, 460-volt power to drive the compressor motor 22, the condenser fan motors 36 and the evaporator fan motors 46. In another embodiment, a transformer (not shown) may be included in operative association with the generator 300 to produce two-phase or three-phase, 230-volt power to drive the compressor motor 22, and/or single-phase, 115-volt power to supply electric current to the condenser fan motor 36, the evaporator fan motor 46, and other components of the refrigerant unit. In an embodiment, the electric generator 300 may comprise a synchronous generator coupled directly to the drive shaft of the prime mover 200, such as disclosed in U.S. Pat. No. 6,223,546, assigned to Carrier Corporation, the entire disclosure of which is hereby incorporated by reference. The synchronous generator may be configured to have an output frequency of 65 Hz at an engine speed of 1950 r.p.m., an output frequency of 45 Hz at an engine speed of 1350 r.p.m. or other output frequency at another engine speed, as desired.

The scroll compressor 20 has a refrigerant discharge outlet 21, a refrigerant suction inlet 23, and an economizer port 25 that opens in refrigerant flow communication to the compression chamber of the scroll compressor 20 at an intermediate pressure stage of the compression process. Refrigerant line 2 connects the discharge outlet 21 of the scroll compressor 20 in refrigerant flow communication with the inlet to the condenser heat exchanger coil 32, refrigerant line 4 connects the outlet of the condenser heat exchanger coil 32 in refrigerant flow communication with the inlet to the evaporator heat exchanger coil 42, and refrigerant line 6 connects the outlet of the evaporator heat exchanger coil 42 in refrigerant flow communication with the suction inlet 23 of the compressor 20, thereby completing the primary refrigerant flow circuit. The evaporator expansion device 50 is interdisposed in refrigerant line 4 in relatively close proximity to the refrigerant inlet to the evaporator 40.

As noted hereinbefore, the refrigeration unit 10 of the invention includes an economizer circuit selectively operable to inject refrigeration vapor into an intermediate stage of the scroll compressor 20. The economizer circuit includes an economizer heat exchanger 60, an economizer refrigerant line 62, an economizer expansion device 70 interdisposed in refrigerant line 62, and an economizer flow control valve 72 interdisposed in refrigerant line 62 upstream with respect to refrigerant flow of the economizer expansion device 70. The economizer refrigerant line 62 interconnects refrigerant line 4 of the primary refrigerant circuit to the economizer port 25 of the scroll compressor 20 that opens to an intermediate pressure stage of the scroll compression chamber.

In the depicted embodiment, the economizer heat exchanger 60 comprises a refrigerant-to-refrigerant heat exchanger economizer 60 having a first refrigerant pass 64 and a second refrigerant pass 66 arranged in heat transfer relationship. The first refrigerant pass 64 forms part of the primary refrigerant circuit and is interdisposed in refrigerant line 4 of the primary refrigerant circuit downstream with respect to refrigerant flow of the condenser heat exchanger unit 30 and upstream with respect to refrigerant flow of the evaporator heat exchanger unit 40. The second refrigerant pass 66 forms part of the economizer circuit and is interdisposed in the economizer refrigerant line 62 downstream with respect to refrigerant flow of the economizer expansion device 70. In the depicted embodiment, the economizer refrigerant line 62 taps into refrigerant line 4 upstream with respect to refrigerant flow of the first pass 64 of the refrigerant-to-refrigerant heat exchanger 60. However, in another embodiment, the economizer refrigerant line 62 may tap into refrigerant line 4 at a location downstream with respect to refrigerant flow of the first pass 64 of the refrigerant-to-refrigerant heat exchanger 60 and upstream with respect to refrigerant flow of the evaporator expansion device 50.

The economizer expansion device 70 meters the refrigerant flow that passes through the economizer refrigerant line 62 and the second pass 66 of the refrigerant-to-refrigerant heat exchanger economizer 60 in heat exchange relationship with the refrigerant passing through the first pass 64 of the refrigerant-to-refrigerant heat exchanger economizer 60 to maintain a desired level of superheat in the refrigerant vapor leaving the second pass 66 of the heat exchanger economizer 60 to ensure that no liquid is present therein. In an embodiment, the economizer expansion device 70 comprises a thermostatic expansion valve that meters refrigerant flow in response to a signal indicative of the refrigerant temperature or pressure sensed by the sensing device 67, which may be a conventional temperature sensing element, such as a bulb or thermocouple mounted to the refrigerant line 62 downstream of the second pass 66 of the economizer heat exchanger 60.

The economizer flow control device 72 is selectively positionable in either a first open position or a second closed position. When the economizer flow control device 72 is positioned in the first open position, refrigerant flows through the economizer refrigerant line 62 as metered by the economizer expansion device 70. When the economizer flow control device 72 is positioned in the second closed position, the flow of refrigerant through the economizer refrigerant line 62 is blocked. In an embodiment, the economizer flow control device 72 may comprise a conventional two-position, on/off, flow control solenoid valve.

In an embodiment, the refrigeration unit 10 includes a bypass flow circuit having a bypass refrigerant line 82 that interconnects the economizer refrigerant line 62 in flow communication with refrigerant line 6 of the primary refrigerant circuit, and a bypass flow control device 80. Bypass refrigerant line 82 taps into the economizer refrigerant line 62 at a location downstream with respect to refrigerant flow of the second pass 66 of the economizer heat exchanger 60 and taps into refrigerant line 6 at a location upstream with respect to refrigerant flow of the suction port 23 of the scroll compressor 20 and downstream with respect to refrigerant flow of the outlet of the evaporator heat exchanger unit 40. The bypass flow control device 80 is interdisposed in the bypass refrigerant line 82 and is selectively positionable in either a first open position or a second closed position.

When the bypass flow control device 80 is in the open position, the economizer flow control device 72 is always positioned in the closed position, thus preventing flow from refrigerant line 4 through the second pass 66 of the economizer heat exchanger 60. Therefore, when the bypass flow control device 80 is positioned in the first open position, intermediate pressure refrigeration vapor passes out of the economizer port 25 of the scroll compressor 20 into and through the economizer refrigerant line 62 to and through the bypass refrigerant line 82 into refrigerant line 6 of the primary refrigerant circuit downstream of the refrigerant outlet of the evaporator heat exchanger unit 40 and passes into the suction port 23 of the scroll compressor 20, thereby unloading potential refrigeration capacity, that is reducing the amount of high pressure refrigeration flow discharging from the scroll compressor 20. When the bypass flow control device 80 is positioned in the second closed position, the flow of intermediate pressure refrigerant from the economizer port 25 of the scroll compressor 20 through the bypass line 82 is blocked. When the refrigeration unit 10 is operated in the economized mode, the economizer flow control device 72 is open and the bypass flow control valve 80 is closed, whereby any refrigerant vapor passing through the second pass 66 of the economizer heat exchanger 60 passes through the economizer refrigerant line 62 into the economizer port 25. In an embodiment, the bypass flow control device 80 may comprise a conventional two-position, on/off, flow control solenoid valve.

In an embodiment, the refrigeration unit 10 may also include a liquid injection circuit that includes a liquid refrigerant line 86 that interconnects refrigerant line 4 of the primary refrigerant circuit in flow communication with refrigerant line 6 of the primary refrigerant circuit, and a liquid injection flow control device 88. Liquid refrigerant line 86 taps into refrigerant line 4 of the primary refrigerant circuit at a location downstream with respect to refrigerant flow of the condenser heat exchanger 40 and upstream with respect to refrigerant flow of the first pass 64 of the economizer heat exchanger 60. The liquid injection flow control device 88 is interdisposed in the liquid injection line 86 and is selectively positionable in either a first open position or a second closed position. When the liquid injection flow control device 88 is positioned in the first open position, refrigerant flows through the liquid injection line 86 into refrigerant line 6 to reduce the degree of superheat of the refrigerant vapor passing to the suction port 23 of the scroll compressor 20. When the liquid injection flow control device 88 is positioned in the second closed position, the flow of refrigerant through the liquid injection line 86 is blocked. In an embodiment, the liquid injection flow control device 88 may comprise a conventional two-position, on/off, flow control solenoid valve.

The refrigeration unit also includes an electronic controller 150 that controls the operation of various components of the refrigeration system. The controller 150 may include a microprocessor 152, an associated memory 154, and an input/output board 156, and an analog-to-digital converter 158 that receives temperature and pressure signals from various points in the system, humidity levels, current inputs and voltage inputs. In an embodiment, the controller 150 may comprise a microprocessor controller such as, by way of example, but not limitation, a MicroLink™ controller available from Carrier Corporation of Syracuse, N.Y., USA. The electronic controller 150 is configured to operate the refrigeration unit 10 to maintain a predetermined thermal environment within the enclosed interior volume, i.e. the cargo box, of the trailer wherein the product is stored. The electronic controller 150 maintains the predetermined environment by selectively controlling the operation of the economized scroll compressor 20, the condenser fan(s) 34 associated with the condenser heat exchanger coil 32, the evaporator fan(s) 44 associated with the evaporator heat exchanger coil 42, the economizer flow control device 72, the bypass flow control device 80 and the liquid injection flow control device 88, if present. For example, when cooling of the environment within the box is required, the electronic controller 150 switches AC electrical current from the generator 300 to the compressor drive motor 22 to activate the drive motor 22 and power the scroll compressor 20, as well as separately powering the motors associated with the condenser fan(s) 34 and the evaporator fan(s) 44.

Additionally, to facilitate control of the refrigeration unit 10, the controller 150 also monitors operating parameters at various points in the refrigeration system through a plurality of sensors and transducers that generate a variable resistance valve indicative of the particular parameter sensed. Among the sensors and transducers that may be provided are: an ambient air temperature sensor, a compressor suction pressure transducer, a compressor suction temperature sensor, a compressor discharge pressure transducer, a compressor discharge temperature sensor, a return air temperature sensor, and a box air temperature sensor. The aforementioned sensors and transducers are merely examples of some of the various sensors/transducers that may be associated with the refrigeration unit 10, and is not meant to limit the type of sensors or transducers that may be included.

As noted previously, the generator 300 supplies AC electric current to power the compressor motor 22 to drive the scroll compressor 20. The power consumed by the economized scroll compressor 20 during operation varies directly with the mass flow rate of the refrigerant output by the compressor 20. The mass flow rate of the refrigerant output by the economized scroll compressor 20 varies directly with the refrigeration load upon the economized scroll compressor 20. The refrigeration load on the economized scroll compressor 20 depends upon a number of factors, including the ambient outdoor temperature, TAM, and the box temperature, TBX, that is the temperature being maintained within the interior of the trailer, i.e. the cargo box, wherein the product being transported is stored. Thus, the amperage of the AC currents is an indirect measurement of the power being consumed.

The controller 150, during operation of the refrigeration unit 10, monitors the electric current drawn by the compressor drive motor 22, the condenser fan motors 36, the evaporator fan motors 46, and other electric components of the system to determine the overall system current draw. When the refrigeration unit 10 is operated during pulldown of the box temperature or maintenance of a very low box temperature under high ambient temperature conditions, the refrigeration capacity demand upon the economized scroll compressor 20 is at a maximum and the electric current drawn by the compressor 20 will also be at its maximum. The controller 150 will compare the actual overall current draw with a predetermined maximum available electric power at the then operating speed, for example either at high speed or at low speed, of the engine 200 powering the generator 300.

If sufficient current is available, the controller 150 will place the economizer flow control device 72 in the open position thereby bringing the economizer circuit into operation whereby refrigerant vapor is injected through the economizer port 25 to the scroll compressor 20 thereby increasing the mass flow rate through the compressor and the refrigeration capacity of the compressor 20. If, however, the available power, i.e. electric current, output from the generator 300 is insufficient to permit operation of or continued operation of the scroll compressor 20 in the economized mode, the controller 150 will place the economizer flow control device 72 in the closed position, thereby blocking refrigeration flow through the economizer circuit and continuing operation of the scroll compressor in a non-economized mode at its maximum design capacity. During operation at high refrigeration capacity, whether in the economized mode or the non-economized mode, the controller 150 will place the bypass flow control device 80 in the closed position.

When the refrigeration demand on the refrigeration unit 10 is below the maximum design capacity, such as during box temperature control following pulldown at a relatively moderate box temperature under similarly moderate ambient temperature conditions, the controller 150 will ensure that the economizer flow control device 72 is positioned in the closed position and place the bypass flow control device 80 in the open position. With the bypass flow control device 80 in the open position, intermediate pressure refrigeration vapor passes out of the economizer port 25 of the scroll compressor 20 into and through the economizer refrigerant line 62 to and through the bypass refrigerant line 82 into refrigerant line 6 of the primary refrigerant circuit downstream of the refrigerant outlet of the evaporator heat exchanger unit 40 and passes into the suction port 23 of the scroll compressor 20. Thus, the amount of high-pressure refrigerant vapor discharging from the discharge port 21 of the scroll compressor 20 into the primary refrigerant circuit and thereafter through the evaporator coil 42 is reduced, thereby reducing the refrigeration capacity of the system.

Thus, the controller 150 will selectively operate the refrigeration unit 10 in one of the economized mode, the non-economized mode or the bypass mode in response to not only the refrigeration demand imposed upon the system, but also in response to the available power that can be generated by the engine driven electric generator 300. The inclusion of an economized scroll compressor 20 in conjunction with an economizer circuit in the refrigeration unit 10 and a bypass circuit in the all electric trailer refrigeration system of the invention permits the controller to optimize refrigeration system performance for the available engine horsepower and generator output throughout the operating envelop of the refrigeration system. This improved degree of optimization is not possible on conventional all electric trailer refrigeration systems incorporating a reciprocating compressor without an economizer circuit as in the prior art.

Additionally, the inclusion of an economized scroll compressor 20 in conjunction with an economizer circuit in the refrigeration unit 10 in an all electric trailer refrigeration system of the invention results in reduced horsepower requirements and reduced generator requirements to meet the same system refrigeration capacity when compared to a conventional all electric trailer refrigeration system incorporating a reciprocating compressor without an economizer circuit as in the prior art, as well exhibiting reduced fuel consumption and emission levels. Because of the efficiency gains realized with the inclusion of an economized scroll compressor 20 in conjunction with an economizer circuit in the refrigeration unit 10 in the all-electric trailer refrigeration system of the invention, for a given capacity demand, less engine horsepower is required. Therefore, the size of the engine, i.e. prime mover 200, can be reduced. Also, the size of the generator 300 can be reduced as the maximum required current demand is lower. Thus, more design space is available for the placement of refrigeration components within the stringent design space limitations within the supporting structural framework mounted to the trailer.

The terminology used herein is for the purpose of description, not limitation. Specific structural and functional details disclosed herein are not to be interpreted as limiting, but merely as basis for teaching one skilled in the art to employ the present invention. While the present invention has been particularly shown and described with reference to the exemplary embodiments as illustrated in the drawing, it will be recognized by those skilled in the art that various modifications may be made without departing from the spirit and scope of the invention. Those skilled in the art will also recognize the equivalents that may be substituted for elements described with reference to the exemplary embodiments disclosed herein without departing from the scope of the present invention.

Therefore, it is intended that the present disclosure not be limited to the particular embodiment(s) disclosed as, but that the disclosure will include all embodiments falling within the scope of the appended claims.

We claim:

1. An electrically powered trailer refrigeration system comprising:

an economized scroll compressor having a discharge port, a suction port, an intermediate pressure stage injection port, and an electric drive motor;

a condenser heat exchanger unit having a refrigerant inlet coupled in refrigerant flow communication with the discharge port of said compressor and a refrigerant outlet, and a condenser fan assembly having at least one electric fan motor;

an evaporator heat exchanger unit having a refrigerant outlet coupled in refrigerant flow communication with the suction port of said compressor and a refrigerant inlet coupled in refrigerant flow communication with the refrigerant outlet of the condenser heat exchanger, thereby forming a primary refrigerant circuit, and an evaporator fan assembly having at least one electric fan motor;

an evaporator expansion device disposed in the primary refrigerant circuit in operative association with the evaporator;

an engine driven electric generator for producing A.C. electric current to power the compressor drive motor, the condenser fan motor and the evaporator fan motor;

an economizer circuit operatively associated with the economized scroll compressor and in refrigerant flow communication with the intermediate pressure stage injection port of the economized scroll compressor; and a controller for determining a required power to operate the refrigeration system including the compressor drive motor, the condenser fan motor and the evaporator fan motor;

wherein the controller selectively opens the economizer circuit and operates the compressor in the economized mode if available power from said engine driven electric generator exceeds the required power for operation of the refrigeration system in the economized mode;

wherein the controller selectively closes the economizer circuit and operates the compressor in the non-economized mode if available power from said engine driven electric generator is less than the required power for operation of the refrigeration system in the economized mode.

2. The electrically powered trailer refrigeration system as recited in claim 1 further comprising a bypass circuit operatively associated with the primary refrigerant circuit and the economizer refrigerant circuit.

3. The electrically powered trailer refrigeration system as recited in claim 2 wherein the controller selectively opens the bypass circuit during low refrigeration capacity demand on the refrigeration system.

4. The electrically powered trailer refrigeration system as recited in claim 1 wherein said scroll compressor comprises a hermetically sealed scroll compressor.

5. The electrically powered trailer refrigeration system as recited in claim 1 wherein the economizer circuit includes a refrigerant-to-refrigerant heat exchanger economizer having a first refrigerant pass and a second refrigerant pass disposed in heat exchange relationship, the first refrigerant pass disposed in the primary refrigerant circuit downstream with respect to refrigerant flow of the condenser heat exchanger and upstream with respect to refrigerant flow of the evaporator expansion device, and second refrigerant pass disposed in the economizer refrigerant circuit in refrigerant flow communication with said first economizer circuit.

6. A method of optimizing the operation of an electrically powered trailer refrigeration system including a refrigeration unit including a refrigeration compressor driven by an electric motor, a condenser heat exchanger unit having at least one condenser fan driven by an electric motor, and an evaporator heat exchanger unit having at least one evaporator fan driven by an electric motor, the refrigeration compressor, the condenser heat exchanger unit and the evaporator heat exchanger unit coupled in refrigerant flow communication in a primary refrigerant circuit, and an electric generator for providing power to each of the compressor drive motor, the condenser fan motor and the evaporator fan motor, said method comprising:

provided a scroll compressor selectively operable in an economized mode or a non-economized mode as the refrigeration compressor;

providing an economizer circuit in operative association with the scroll compressor, the economizer circuit being selectively opened or closed;

determining a maximum power available from the electric generator;

determining an overall required power to operate the refrigeration system including the compressor drive motor, the condenser fan motor and the evaporator fan motor;

selectively opening the economizer circuit and operating the compressor in the economized mode if the maximum available power exceeds the overall required power for operation of the refrigeration system in the economized mode; and selectively closing the economizer circuit and operating the compressor in the non-economized mode if the maximum available power is less than the overall required power for operation of the refrigeration system in the economized mode.

7. The method as recited in claim 6 further comprising:

providing a bypass circuit connecting an intermediate pressure stage of the scroll compressor in refrigerant flow communication with a suction inlet of the scroll compressor, the bypass circuit being selectively opened or closed; and selectively opening the bypass circuit during low refrigeration capacity demand on the refrigeration system.

8. A method of optimizing the operation of an electrically powered refrigeration system including a refrigeration unit including a refrigeration compressor driven by an electric motor, a condenser heat exchanger unit having at least one condenser fan driven by an electric motor, and an evaporator heat exchanger unit having at least one evaporator fan driven by an electric motor, the refrigeration compressor, the condenser heat exchanger unit and the evaporator heat exchanger unit coupled in refrigerant flow communication in a primary refrigerant circuit, and an electric generator for providing power to each of the compressor drive motor, the condenser fan motor and the evaporator fan motor, said method comprising:

providing a scroll compressor selectively operable in an economized mode or a non-economized mode as the refrigeration compressor;

providing an economizer circuit in operative association with the scroll compressor, the economizer circuit being selectively opened or closed;

providing a bypass circuit connecting an intermediate pressure stage of the scroll compressor in refrigerant flow communication with a suction inlet of the scroll compressor, the bypass circuit being selectively opened or closed determining a refrigeration demand on the refrigeration system; determining a maximum power available from the electric generator; determining an overall required power to operate the refrigeration system including the compressor drive motor, the condenser fan motor and the evaporator fan motor to meet the determined refrigeration demand;

selectively opening the economizer circuit and closing the bypass circuit and operating the compressor in the economized mode if the maximum available power exceeds the overall required power for operation of the refrigeration system in the economized mode when the determined refrigeration demand is at a refrigeration system design capacity;

selectively closing the economizer circuit and closing the bypass circuit and operating the compressor in the non-economized mode if the maximum available power is less than the overall required power for operation of the refrigeration system in the economized mode when the determined refrigeration demand is at a refrigeration system design capacity; and selectively closing the economizer circuit and closing the bypass circuit and operating the compressor in the non-economized mode if the available power exceeds the overall required power for operation of the refrigeration system in the non-economized mode when the determined refrigeration demand is below a refrigeration system design capacity.

* * * * *